United States Patent [19]
Stone

[11] 3,901,552

[45] Aug. 26, 1975

[54] GRANULAR-FLOOR SUPPORTED CARGO HAULING TRAILER APPARATUS

[76] Inventor: Jack C. Stone, Box 310, Burns Flat, Foster, Okla. 73624

[22] Filed: Dec. 10, 1973

[21] Appl. No.: 423,316

[52] U.S. Cl. .................................. 298/24; 105/243
[51] Int. Cl. .............................................. B60p 1/56
[58] Field of Search .......... 298/24, 8 H; 280/31, 30, 280/415 R, 423 R; 296/10, 11, 12, 14; 105/358, 359, 370, 371, 372, 422, 376, 375, 243; 214/44 R

[56] References Cited
UNITED STATES PATENTS

| | | | |
|---|---|---|---|
| 995,214 | 6/1911 | Becker | 105/243 |
| 3,692,363 | 9/1972 | Tenebaum et al. | 298/24 |

*Primary Examiner*—Frank E. Werner
*Attorney, Agent, or Firm*—Dunlap & Codding

[57] ABSTRACT

An improved trailer apparatus convertible to one position for hauling floor supported cargo and to one other position for hauling granular material and the like, the trailer having a trailer floor assembly comprising floor sections movably connected to the trailer frame and pivotally positionable to provide a floor surface suitable for supporting cargo in a floor supported cargo hauling position and pivotally positionable to provide a hopper wall structure forming a material bin space for receiving and holding a granular material and the like in a granular material hauling position of the trailer.

9 Claims, 11 Drawing Figures

GRANULAR-FLOOR SUPPORTED CARGO HAULING TRAILER APPARATUS

BACKGROUND OF THE INVENTION

1. Field of the Invention

The present invention relates generally to trailer constructions and, more particularly, but not by way of limitation, to a trailer apparatus convertible to haul floor supported cargo and the like in one position and to haul granular material and the like in one other position.

2. Description of the Prior Art

In the past, various trailer and railroad car constructions have been proposed wherein a portion of the vehicle was adapted for hauling floor supported cargoes such as cattle, for example, and constructed to be converted to a trailer for hauling a granular material or the like. In some of the past constructions, the trailer floor or trailer bed was constructed such that a portion thereof could be removed or pivoted for positioning the trailer for hauling granular material or floor supported cargo. In other past proposed constructions, movable handle elements were supported from the sides or roof of a vehicle such that the handles could be moved and oriented within the vehicle for positioning the vehicle to haul granular material or floor supported type cargo.

One convertible vehicle body proposed in the past was described in the U.S. Pat. NO. 3,087,759, issued to Worster, wherein a plurality of grain bins were supported beneath a pair of floor sheets hinged to the trailer floor, the floor sheets being swingable to positions exposing the grain bins. This particular vehicle body also included a plate movably attached to the vehicle and swingable over one of the floor sheets to form a seal so that the trailer could be used for carrying granular material such as sugar or grain. One of the floor sheets was swingable in a rearward direction and the other floor sheet was swingable in a forward direction, the two floor sheets being swingable to a position wherein the floor sheets cooperated with a portion of the trailer sides to form a bin like structure in the granular hauling position of the trailer.

The U.S. Pat. Nos. 1,935,057, issued to Natali; 1,384,500, issued to Westgate; and 2,049,617, issued to Pflater, each disclosed a railway car or the like having a hopper connected to the bottom of the vehicle and constructed such that a portion of the floor or bottom was swingable to a position exposing the hopper to a portion of the interior space within the car. The U.S. Pat. No. 2,071,620, issued to Fitch, disclosed a convertible vehicle wherein the floor of the vehicle included movable sections swingable to an upright position forming the vehicle sides.

The U.S. Pat. No. 2,459,022, disclosed a truck body having a closed refrigerated compartment and a ventilated compartment, the vehicle being constructed such that the cargo space could be divided into one completely closed compartment or one closed compartment in combination with one ventilated compartment. The U.S. Pat. No. 2,768,021, issued to Kaster; 3,037,807, issued to Hicks; 2,839,326, issued to Simpkins; and 3,033,606, issued to Turner, each disclosed a transport type trailer construction having movable trailer bed portions arranged for converting the vehicle to various transport positions. The U.S. Pat. Nos. 2,129,438, issued to Nitsche; 1,533,475, issued to Moak; 2,224,126, issued to Eilert; 2,836,455, issued to Hathaway; and 1,311,429, issued to Weir, each disclosed a slatted type of vehicle construction having a control assembly for controlling closing the spaces between the trailer slats in an effort to provide a substantially closed trailer wall construction. The U.S. Pat. Nos. 1,179,402, issued to Claudin; 2,780,473, issued to Harrison; 2,766,062, issued to Martin; 1,933,800, issued to Hannaman; and 2,769,658, issued to Edmonds, each disclosed a vehicle having positionable wall structures of adapting the vehicle to various cargo carrying positions.

SUMMARY OF THE INVENTION

An object of the invention is to provide an improved ventilated truck trailer which can be converted for hauling granular material and the like in a fast, convenient, efficient and economical manner.

Another object of the invention is to provide an improved floor assembly for a dual purpose type truck trailer construction wherein the floor sections are positionable for hauling floor supported cargo and granular material and the like in a fast, efficient and economical manner.

A further object of the invention is to provide a dual purpose type of trailer construction for hauling floor supported cargo and granular material and the like which is economical in the construction and operation thereof.

Other objects and advantages of the invention will be evident from the following detailed description when read in conjunction with the accompanying drawings which illustrate various preferred embodiments of the invention.

DESCRIPTION OF THE PREFERRED EMBODIMENTS

Figure 1:
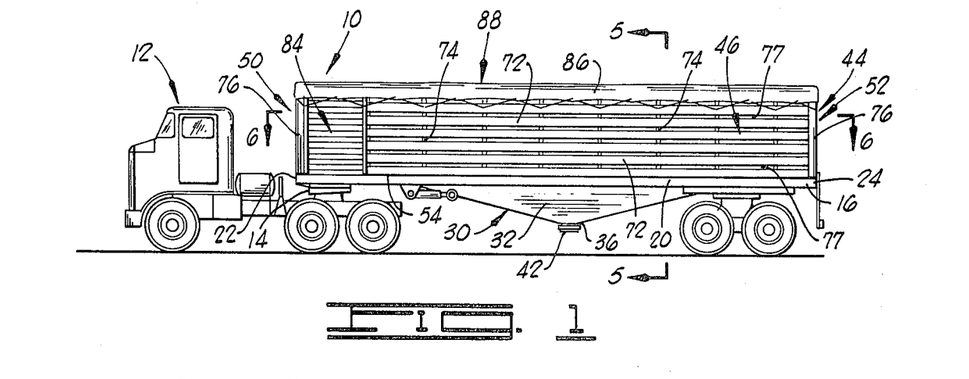
FIG. 1 is a side elevational view showing a truck tractor connected to a truck trailer, the truck trailer being constructed in accordance with the present invention.

Referring to the drawings in general and to FIG. 1 in particular, shown therein and designated by the general reference numeral 10 is a trailer connected in an assembled position to a truck tractor 12, the trailer 10 being constructed in accordance with the present invention positionable in granular material hauling and floor supported cargo hauling positions such that the trailer 10 can receive and be utilized to transport floor supported cargoes such as cattle or the like, for example, generally requiring a ventilated type of trailer construction and such that the trailer 10 can receive and be utilized to transport granular material such as sugar, grain and the like, for example, generally requiring a storage material bin space communicating with a hopper assembly or the like for unloading the transported, stored granular material. The trailer 10 is, more particularly, connectable to a conventional, tiltable fifth wheel assembly 14 of the truck tractor 12 so that the trailer 10 can be transported from one location to another via the truck tractor 12, in a conventional manner well-known in the art.

It should be noted that the term "floor supported cargo" is utilized herein to refer generally to a class of cargo requiring a floor or platform type of structure upon which the cargo may be placed and supported during the transportation thereof. The present invention is particularly adaptable and suitable for hauling floor supported cargo of the type requiring ventilation, generally provided via ventilation openings in the trailer wall assembly, in a manner to be described in greater detail below.

Figure 2:
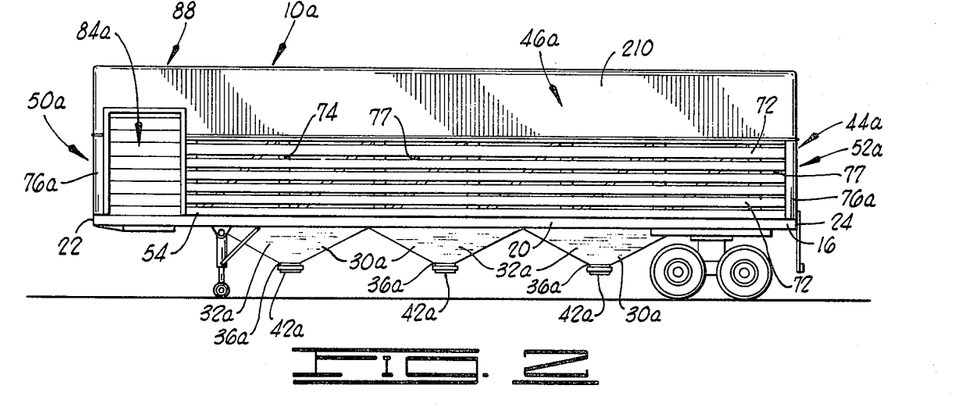
FIG. 2 is a side elevational view, similar to FIG. 1, but showing a modified truck trailer constructed in accordance with the present invention.
Figure 3:
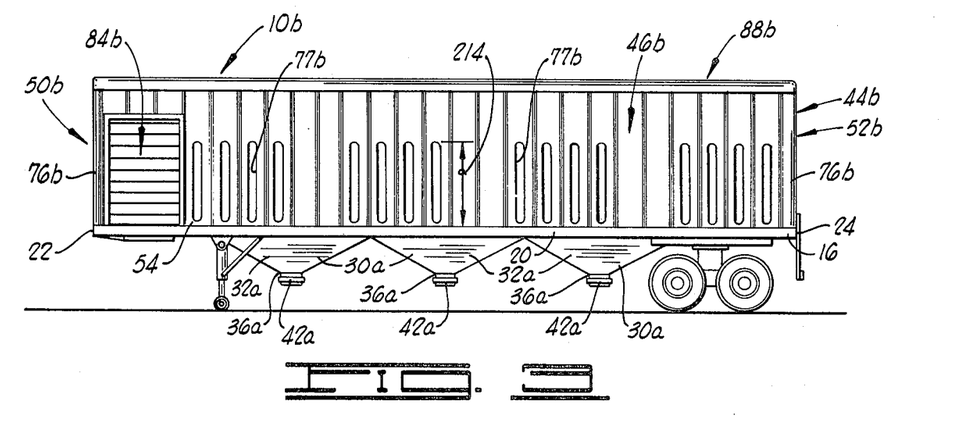
FIG. 3 is a side elevational view, similar to FIG. 2, but showing still another modified truck trailer.

Shown in FIGS. 2 and 3 are modified trailers 10a and 10b, and each of the trailers 10, 10a and 10b utilize a similar floor assembly constructed to cooperate with the ventilated trailer walls for positioning the trailers 10, 10a and 10b in granular material and floor supported cargo hauling positions. Therefore, the apparatus of the present invention will initially be described with respect to the trailer 10.

Referring more particularly to the construction of the trailer 10, shown in FIGS. 1 and 4 through 9, the trailer 10 includes a trailer frame 16 having a first side 18, a second side 20, a forward end 22 and a rearward end 24. One end of the first side 18 is securely connected to one end of the forward end 22 and the opposite end of the first side 18 is securely connected to one end of the rearward end 24. One end of the second side 20 is securely connected to the end of the forward end 22 opposite the end thereof connected to the first side 18 and the opposite end of the second side 20 is securely connected to the end of the rearward end 24 opposite the end of the rearward end 24 connected to the first side 18.

The trailer frame 16 is thus connected such that the first and second sides 18 and 20 extend in substantially parallel vertical planes and the first and second sides 18 and 20 are each disposed and supported in a substantially coplanar horizontal disposition. The forward and the rearward ends 22 and 24 are spaced apart a predetermined distance substantially corresponding to the length of the first and second sides 18 and 20, the forward and rearward ends 22 and 24 each extending in substantially parallel vertical planes and each being disposed in a substantially coplanar horizontal disposition.

The first and the second sides 18 and 20 and the forward and rearward ends 22 and 24 provide the basic supporting structure for the trailer 10, the first and second sides 18 and 20 being spaced apart a predetermined distance and the forward and the rearward ends 22 and 24 being spaced apart a predetermined distance forming a generally rectangularly shaped trailer frame 16 and defining a trailer frame opening 26 extending between the first and second sides 18 and 20 and the forward and rearward ends 22 and 24. As shown more clearly in FIGS. 6 and 7, a plurality of spaced support beams 28 (only some of the support beams 28 being designated via a reference numeral in the drawings for the purpose of clarity) extend between the first and the second sides 18 and 20, one end of each of the support beams 28 being secured to the first side 18 and the opposite end of each of the support beams 28 being secured to the second side 20 of the trailer frame 16, the support beams 28 being secured between the first and second sides 18 and 20 and spaced between the forward and rearward ends 22 and 24 of the trailer frame 16 to augment the structural integrity of the trailer frame 16.

The trailer 10 also includes a frusto-conically shaped hopper 30, having interconnected hopper sides 32 tapered inwardly from an open upper end 34 of the hopper toward an open lower end 36. The hopper sides 32, generally adjacent the open upper end 34 of the hopper 30, are each securedly connected to the trailer hopper 30 generally between the forward and rearward frame 16 generally between the forward and rearward ends 22 and 24 and generally between the first and the second sides 18 and 20. The hopper sides 32 of the hopper 30 form a hopper material bin space 38 for receiving and holding granular material and the like generally between the open upper end 34 and the open lower end 36.

In one preferred form, as shown more clearly in FIG. 7, one of the hopper sides 32 is securely connected to the first side 18 of the trailer frame 16 and one other of the hopper sides 32 is connected to the second side 20, the remaining two hopper sides 32 being secured to portions of two of the support beams 28 thereby securing the open upper end 34 of the hopper 30 to the trailer frame 16 such that the hopper 30 is disposed and extends generally below the trailer frame 16. In an assembled position of the hopper 30, the open upper end 34 of the hopper 30 is thus disposed generally adjacent and in communication with a portion of the trailer frame opening 26, the open upper end 34 and the portion of the trailer frame opening 26 in communication therewith forming what is sometimes referred to herein as a "hopper inlet opening 40" for receiving granular material and the like therethrough to be disposed within the hopper material bin space 38 during one aspect of the operation of the trailer 10.

A hopper door 42 is movably connected to the hopper sides 32, generally near the open lower end 36 thereof, the hopper door 42 being positionable in an opened and a closed position. In an open position of the hopper door 42, the open lower end 36 is substantially opened allowing the granular material or the like stored and disposed within the hopper material bin space 60 to be discharged therethrough. In the closed position of the hopper door 42, the hopper door 42 substantially covers the open lower end 36 preventing the release of and retaining the granular material or the like stored within the hopper material bin space 38.

Various forms of hopper connectable to frames of trailer bodies or railway cars and constructed for retaining or storing a predetermined volume of granular material within a hopper material bin space having a hopper door positionable to opened and closed positions in a manner described before with respect to the hopper 30 and the hopper door 42 are shown and described in various aspects in the reference patents referred to before in the description of the prior art. Since various embodiments of conventional hoppers and hopper doors can be utilized and incorporated in combination with the trailer of the present invention, further detailed discussion with respect to the construction and the operation of the hopper 30 and hopper door 42 is not necessary herein.

The trailer 10 includes a trailer wall assembly 44 comprising a first side wall 46, a second side wall 48, a forward end wall 50 and a rearward end wall 52.

The first side wall 46 has a lower end 54 connected to the trailer frame 16, generally near the first side 18 thereof, and extends a predetermined distance generally perpendicularly upwardly therefrom terminating with an upper end 56. A lower end 58 of the second side wall 48 is connected to the trailer frame 16, generally near the second side 20 thereof, the second side wall 48 extending a distance generally perpendicularly upwardly from the trailer frames 16 terminating with an upper end 60. A lower end 62 of the forward end wall 50 is connected to the trailer frame 16, generally near the forward end 22 thereof, the forward end wall 50 extending a distance generally perpendicularly upwardly from the trailer frame 16 terminating with an upper end 64. A lower end 66 of the rearward end wall 52 is connected to the trailer frame 16, generally near the rearward end wall 24 thereof, the rearward end wall 52 extending a distance generally perpendicularly upwardly from the trailer frame 16 terminating with an upper end 68. The upper ends 56, 60, 64 and 68 of the first and the second side walls 46 and 48 and the forward and rearward end walls 50 and 52 are each disposed in a substantially coplanar horizontal relationship cooperatingly forming what is sometimes referred to herein as an upper end 70 of the trailer wall assembly 44.

The first and the second side walls 46 and 48 and the forward and the rearward end walls 50 and 52 each include a plurality of spaced slat members 72. The slat members 72 are secured to a plurality of vertical support beams 74 (only some of the vertical support beams 74 being designated via a reference numeral in the drawings for the purpose of clarity). One end of each of the vertical support beams 74 is connected to the trailer frame 16 and each of the vertical support beams 74 is spaced apart a predetermined distance and extends generally vertically upwardly from the trailer frame 16.

A corner support member 76 is disposed at each corner of the trailer frame 16, one end of each of the corner support members 76 being secured to the trailer frame 16 and each of the corner support members 76 extending generally vertically upwardly from the trailer frame 16. More particularly, one of the corner support members 76 is disposed between and connects the ends of the first side 18 of the forward end 22; one of the corner support members 76 is disposed between and connects the ends of the first side 18 and the rearward end 24; one of the corner support members 76 is disposed between and connects the ends of the second side 20 and the rearward end 24; and one of the corner support members 76 is disposed between and connects the ends of the second side 20 and the forward end 22. The spaced slat members 72, the vertical support beams 74 and the corner support members 76 each cooperate to form the first and the second side walls 46 and 48 and the forward and the rearward end walls 50 and 52 of the trailer 10, the slat members 72 being spaced apart a predetermined distance providing ventilation openings 77 facilitating the circulation of air through the portion of the trailer 10 encompassed via the walls 46, 48, 50 and 52.

Figure 4:
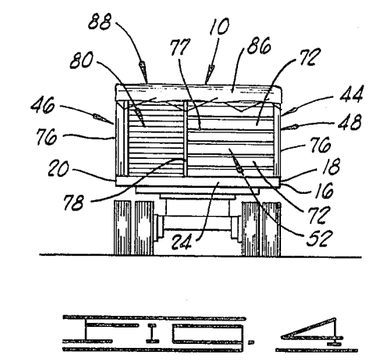
FIG. 4 is an end elevational view of the truck trailer of FIG. 1.
Figure 5:
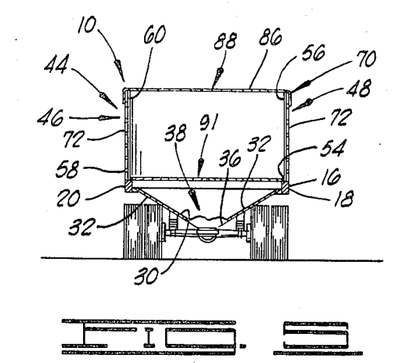
FIG. 5 is a sectional view of the truck trailer of FIG. 1, taken substantially along the lines 5—5 of FIG. 1.

As shown more clearly in FIG. 4, a rear door opening 78 is formed through a portion of the rearward end wall 52 and a rear door 80 is supported within the rear door opening 78 (the rear door 80 being shown in a closed position in FIG. 4). As shown more clearly in FIG. 1, a side door opening 82 is formed through a portion of the second side wall 48, generally near the forward end 22 of the trailer frame 16, and a side door 84 is disposed within the side door opening 82, the side door 84 being positionable in opened and closed positions (side door 84 being shown in FIG. 1 in a closed position). The rear door 80 and the side door 84 are each positionable in open and closed positions and each cooperate to facilitate the loading and unloading of the trailer 10 from the forward and the rearward ends 22 and 24 thereof during one aspect of the operation of the trailer 10.

A tarpaulin type of roof cover 86 is disposed over the upper end 70 of the trailer 10, portions of the roof cover 86 being secured to the first and the second side walls 46 and 48 and to portions of the forward and the rearward end walls 50 and 52 thereby securedly positioning the roof cover 86 over the upper end 70 of the trailer 10. In the embodiment of the trailer 10, shown in FIG. 1, the roof cover 86 substantially encompasses the upper end 70 and forms the trailer top 88 of the trailer 10.

Figure 6:
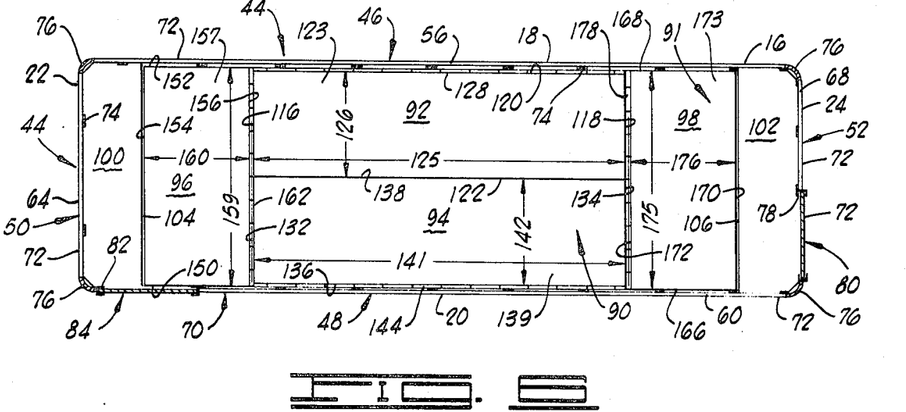
FIG. 6 is a top plan view of the floor assembly of the trailer apparatus of FIG. 1 showing the floor assembly positioned in a floor supported cargo hauling position, taken substantially along the lines 6—6 of FIG. 1.
Figure 7:
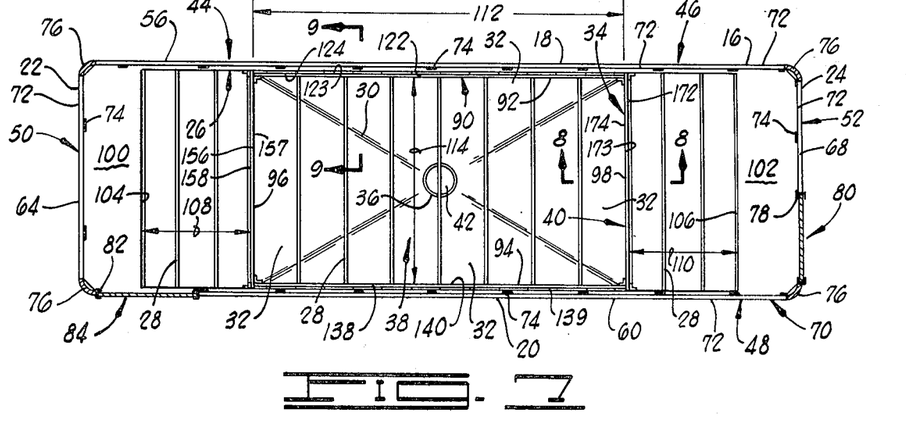
FIG. 7 is a top plan view of the trailer floor assembly, similar to FIG. 6, but showing the floor assembly positioned in a granular material hauling position.
Figures 10, 11:
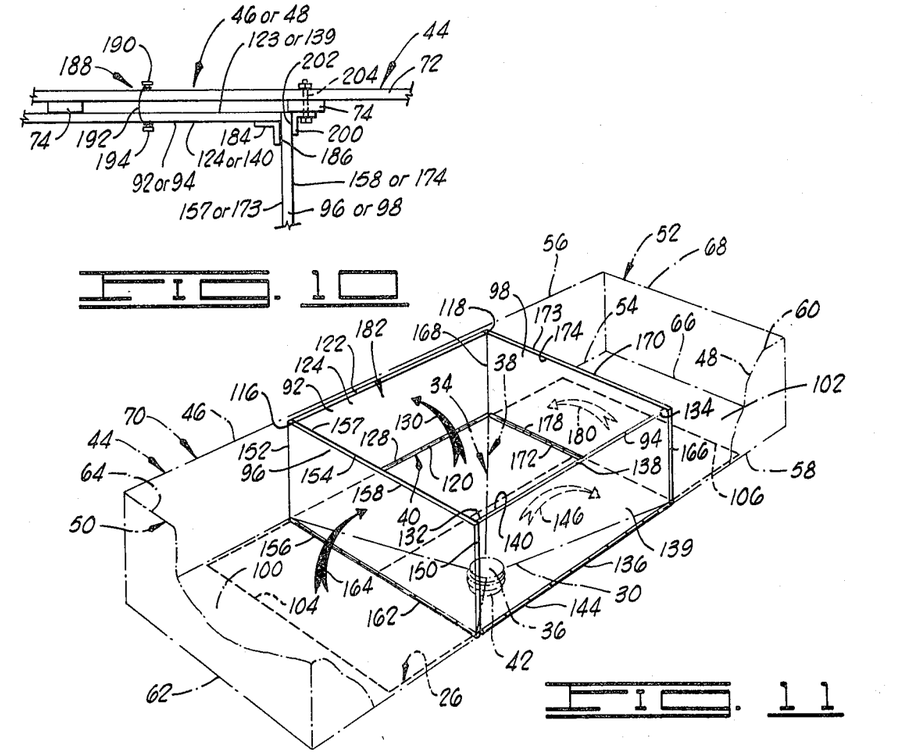
FIG. 10 is an enlarged, fragmentary view showing a typical connection between the first or the second floor sections and the rearward or the forward floor sections of the trailer floor assembly of the present invention positioned in a granular material hauling position.
FIG. 11 is a diagrammatic view showing the trailer wall assembly, the trailer floor assembly positioned in a granular material hauling position and the hopper, the first and the second floor sections and the rearward and the forward floor sections of the trailer floor assembly being shown substantially in solid-lines and the trailer wall assembly, the hopper assembly and a portion of the trailer floor assembly being shown in dashed-lines.

As shown more clearly in FIGS. 6, 7, and 11, the trailer 10 includes a floor assembly 90 positionable in a granular material hauling position and in a floor supported cargo hauling position, the trailer 10 being constructed to haul cargo of the type which is at least partially supported on the trailer floor assembly 90 such as cattle, for example, and to haul cargo of the type which is retained within a material bin space such as grain or sugar or the like, for example, as mentioned before. The floor assembly 90 is connected to the first and the second sides 18 and 20 and to the forward and the rearward ends 22 and 24 of the trailer frame 16 and extends therebetween providing a substantially continuous unitary floor supporting structure 91 in a floor supported cargo hauling position, as shown in FIG. 6.

The floor assembly 90, more particularly includes a first floor section 92, a second floor section 94, a forward floor section 96, a rearward floor section 98, a forward floor panel 100 and a rearward floor panel 102. The forward floor panel 100 is secured to the forward end 22 of the trailer frame 16 and extends generally between the first and the second sides 18 and 20, the forward floor panel 100 encompassing and covering a portion of the trailer frame opening 26 and extending a distance generally toward the rearward end 24 of the trailer frame 16 terminating with a rearwardmost edge 104 thereof. The rearward floor panel 102 is secured to the rearward end 24 of the trailer frame 16 and extends generally between the first and the second sides 18 and 20, the rearward floor panel 102 encompassing and covering a portion of the trailer frame opening 26 and extending a distance generally toward the forward end 22 terminating with a forwardmost edge 106. The forward and the rearward floor panels 100 and 102 are thus secured to the trailer frame 16 and provide a permanently located portion of trailer floor supporting structure 91; the rearwardmost edge 104 of the forward floor panel 100, the forwardmost edge 106 of the rearward floor panel 102 and a portion of the first and the second sides 18 and 20 of the trailer frame 16 cooperatingly encompass a portion of the trailer frame opening 26, as shown more clearly in FIGS. 6 and 7.

As shown more clearly in FIG. 7, the rearwardmost edge 104 of the forward floor panel 100 is, more particularly, spaced a distance 108 from the hopper inlet opening 40 and the forwardmost edge 106 of the rearward floor panel 102 is spaced a distance 110 from the hopper inlet opening 40. The hopper inlet opening 40 formed via the open upper end 34 of the hopper 30 and a portion of the trailer frame opening 26 has a length 112 and a width 114. In one preferred embodiment, the distances 108 and 110 are substantially equal and the distances 108 and 110 are each substantially equal to one-half the width 114 of the hopper inlet opening 40 for reasons which will be made more apparent below.

As shown more clearly in FIGS. 6 and 11, the first floor section 92 has opposite ends 116 and 118, opposite sides 120 and 122, and an upper and a lower face 123 and 124. The length 125 between the opposite ends 116 and 118 of the first floor section 92 is substantially equal to the length 112 of the hopper inlet opening 40 and the width 126 generally between the opposite sides 120 and 122 of the first floor section 92 is substantially equal to one-half of the width 114 of the hopper inlet opening 40. The side 120 of the first floor section 92 is hingedly connected to a portion of the first side 18 of the trailer frame 16 at a hinged connection 128 such that the first floor section 92 can be pivoted in a pivot direction 130, as shown in FIG. 11, pivotally moving a first floor section 92 generally toward the first side wall 46 to a granular material hauling position wherein the first floor section 92 extends a distance generally perpendicularly upwardly from the trailer frame 16 and the upper face 123 is disposed generally near the first side wall 46. The first floor section 92 is also pivotable in a direction generally toward the support frame 16, in a pivot direction generally opposite the pivot direction 130, pivoting the first floor section 92 to a position wherein a portion of the lower face 124 of the first floor section 92 engages a portion of some of the support beams 28 of the trailer frame 16 disposed generally beneath the first floor section 92. The first floor section 92 supportingly engages the support beams 28 in such a manner that the pivotal movement of the first floor section 92 in a direction generally toward the trailer frame 16 is limited via the supporting engagement between the first floor section 92 and the support beams 28, the support beams 28 of the trailer frame 16 cooperating to support the first floor section 92 in a floor supported cargo hauling position, as shown in FIG. 6, wherein the first floor section 92 extends generally perpendicularly from the first side wall 46 and is disposed generally adjacent the trailer frame 16 in the floor supported cargo hauling position of the first floor section 92, the uppper face 123 of the first floor section 92 cooperating to form a portion of the trailer floor supporting structure 91 for receiving and supporting cargo to be transported via the trailer 10.

The second floor section 94 has opposite ends 132 and 134, opposite sides 136 and 138, and an upper and a lower face 139 and 140. The length 141 between the opposite ends 132 and 134 of the second floor section 94 is substantially equal to the length 112 of the hopper inlet opening 40 and the width 142 generally between the opposite sides 136 and 138 of the second floor section 94 is substantially equal to one-half of the width 114 of the hopper inlet opening 40. The side 136 of the second floor section 94 is hingedly connected to a portion of the second side 20 of the trailer frame 16 at a hinged connection 144 such that the second floor section 94 can be pivoted in a pivot direction 146, as shown in FIG. 11, pivotally moving a second floor section 94 generally toward the second side wall 48 to a granular material hauling position wherein the second floor section 94 extends a distance generally perpendicularly upwardly from the trailer frame 16 and the upper face 139 is disposed generally near the second side wall 48. The second floor section 94 is also pivotable in a direction generally toward the support frame 16, in a pivot direction generally opposite the pivot direction 146, pivoting the second floor section 94 to a position wherein the lower face 140 of the second floor section 94 engages a portion of the support beams 28 of the trailer frame 16 disposed generally beneath the second floor section 94. The lower face 139 of the second floor section 94 supportingly engages the support beams 28 in such a manner that the pivotal movement of the second floor section 94 in a direction generally toward the trailer frame 16 is limited via the supporting engagement between the second floor section 94 and the support beams 28, the support beams 28 of the trailer frame 16 cooperating to support the second floor section 94 in a floor supported cargo hauling position, as shown in FIG. 6, wherein the second floor section 94 extends generally perpendicularly from the second side wall 48 and the lower face 140 is disposed generally adjacent the trailer frame 16 in the floor supported cargo hauling position of the second floor section 94, the upper face 139 of the second floor section 94 cooperating to form a portion of the trailer floor supporting structure 91 for receiving and supporting cargo to be transported via the trailer 10.

The forward floor section 96 has opposite ends 150 and 152, opposite sides 154 and 156, and an upper and a lower face 157 and 158. The length 159 between the opposite ends 150 and 152 of the forward floor section 96 is substantially equal to the width 114 of the hopper inlet opening 40 and the width 160 generally between the opposite sides 154 and 156 of the forward floor section 96 is substantially equal to the widths 126 and 142 of the first and the second floor sections 92 and 94. The side 156 of the forward floor section 96 is hingedly connected to one of the support beams 28 at a hinged connection 162 and is disposed generally adjacent the ends 116 and 132 of the first and the second floor sections 92 and 94 such that the forward floor section 96 can be pivoted in a pivot direction 164, as shown in FIG. 11, pivotally moving a forward floor section 96 generally toward the first and the second floor sections 92 and 94 to a granular material hauling position wherein the forward floor section 96 extends a distance generally perpendicularly upwardly from the trailer frame 16 and the upper face 157 is disposed generally adjacent the ends 116 and 132 of the first and the second floor sections 92 and 94 in a granular material hauling position of the first and the second floor sections 92 and 94. The forward floor section 96 is also pivotable in a direction generally toward the support frame 16, in a pivot direction generally opposite the pivot direction 130, pivoting the forward floor section 96 to a position wherein the lower face 158 of the forward floor section 96 engages a portion of some of the support beams 28 disposed generally beneath the forward floor section 96. The lower face 158 of the forward floor section 96 supportingly engages the support beams 28 in such a manner that the pivotal movement of the forward floor section 96 in a direction generally toward the trailer frame 16 is limited via the supporting engagement between the forward floor section 96 and the support beams 28, the support beams 28 of the trailer frame 16 cooperating to support the forward floor section 96 in a floor supported cargo hauling position, as shown in FIG. 6, wherein the lower face 158 of the forward floor section 96 is disposed generally adjacent the trailer frame 16 in the floor supported cargo hauling position of the forward floor section 96, the upper face 157 of the forward floor section 96 cooperating to form a portion of the trailer floor supporting structure 91 for receiving and supporting cargo to be transported via the trailer 10.

The rearward floor section 98 has opposite ends 166 and 168, opposite sides 170 and 172, and an upper and a lower face 173 and 174. The length 175 between the opposite ends 166 and 168 of the rearward floor section 98 is substantially equal to the width 174 of the hopper inlet opening 40 and the width 176 generally between the opposite sides 170 and 172 of the rearward floor section 98 is substantially equal to the widths 126, 142 and 156 of the first and the second floor sections 92 and 94 and the forward floor section 96, respectively. The side 170 of the rearward floor section 98 is hingedly connected to one of the support beams 28 at a hinged connection 178 and is disposed generally adjacent the ends 118 and 134 of the first and the second floor sections 92 and 94 such that the rearward floor section 98 can be pivoted in a pivot direction 180, as shown in FIG. 11, pivotally moving a rearward floor section 98 generally toward the first and the second floor sections 92 and 94 to a granular material hauling position wherein the rearward floor section 98 extends a distance generally perpendicularly upwardly from the trailer frame 16 and the upper face 173 is disposed generally adjacent the ends 118 and 134 of the first and the second floor sections 92 and 94 in a granular material hauling position of the first and the second floor sections 92 and 94. The rearward floor section 98 is also pivotable in a direction generally toward the support frame 16, in a pivot direction generally opposite the pivot direction 180, pivoting the rearward floor section 98 to a position wherein the lower face 174 of the rearward floor section 98 engages a portion of some of the support beams 28 disposed generally beneath the rearward floor section 98. The lower face 174 of the rearward floor section 98 supportingly engages the support beams 28 in such a manner that the pivotal movement of the rearward floor section 98 in a direction generally toward the trailer frame 16 is limited via the supporting engagement between the rearward floor section 98 and the support beams 28, the support beams 28 of the trailer frame 16 cooperating to support the rearward floor section 98 in a floor supported cargo hauling position, as shown in FIG. 6, wherein the lower face 174 of the rearward floor section 98 is disposed generally adjacent the trailer frame 16 in the floor supported cargo hauling position of the rearward floor section 98, the upper face 173 of the rearward floor section 98 cooperating to form a portion of the trailer floor supporting structure 91 for receiving and supporting cargo to be transported via the trailer 10.

Figure 8:
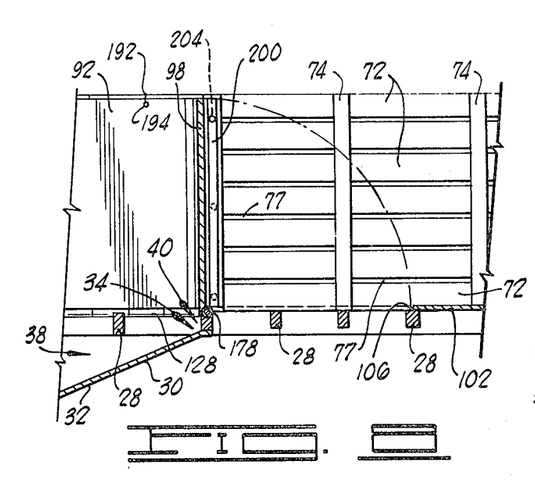
FIG. 8 is a fragmentary, enlarged sectional view of the trailer floor assembly of FIG. 7, taken substantially along the lines 8—8 of FIG. 7.

As shown more clearly in FIG. 8, the hinged connection 178 between the rearward floor section 98 and one of the support beams 28 of the trailer frame 16 is disposed and oriented such that the upper face 173 of the rearward floor section 98 is disposed in a substantially coplanar horizontal disposition with respect to the upper faces of the forward and rearward floor panels 100 and 102 in a floor supported cargo hauling position of the rearward floor section 98 wherein the rearward floor section 98 is engaged and supported via the support beams 28 (the rearward floor sections 98 being shown in FIG. 8 in the floor supported cargo hauling position in dashed-lines). The hinged connection 162 between the forward floor section 96 and one of the support beams 28 of the trailer frame 10 is disposed and oriented in a manner exactly like that described with respect to the hinged connection 180 of the rearward floor section 98 such that when the forward floor section 96 is pivoted to a floor supported cargo hauling position wherein the forward floor section 96 is supported via the support beams 28, the upper face 157 of the forward floor section 96 is disposed in a substantially coplanar horizontal disposition with respect to the upper faces of the forward and the rearward floor panels 100 and 102.

Figure 9:
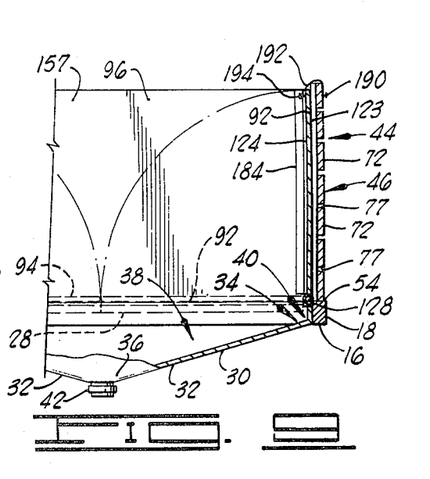
FIG. 9 is an enlarged, fragmentary sectional view of the trailer floor assembly of FIG. 7, taken substantially along the lines 9—9 of FIG. 7.

As shown more clearly in FIG. 9, the hinged connection 128 of the first floor section 92 is disposed such that, when the first floor section 92 is pivoted to a floor supported cargo hauling position wherein the first floor section 92 is supported via the support beams 28, the upper face 123 of the first floor section 92 is disposed in a substantially coplanar horizontal disposition with respect to the upper faces of the forward and the rearward floor panels 100 and 102 (the first floor section 92 being shown in FIG. 9 in the floor supported cargo hauling position in dashed-lines). The hinged connection 144 of the second floor section 94 is disposed and oriented in a manner exactly like that shown in FIG. 9 with respect to the first floor section 92 such that, when the second floor section 94 is moved to a floor supported cargo hauling position wherein the second floor section 94 is supported via the support beams 28, the upper face 139 of the second floor section 94 is disposed in a substantially coplanar horizontal disposition with respect to the upper faces of the forward and the rearward floor panels 100 and 102.

Thus, the hinged connections 128, 144, 162 and 178 are each disposed and oriented such that when the first and the second floor sections 92 and 94 and the forward and the rearward floor sections 96 and 98 are each pivoted to floor supported cargo hauling positions, as shown in FIG. 6, the upper faces 123, 139, 157 and 173 of the floor sections 92, 94, 96 and 98, respectively, are each disposed and oriented in a substantially coplanar horizontal disposition with respect to the upper faces of the forward and the rearward floor panels 100 and 102 to provide a substantially continuous coplanar floor supporting structure 91 for supporting cargo hauled via the trailer 10 in this position of the floor assembly 90 thereof. Further, the width 126 of the first floor section 92 is sized such that the first floor section 92 covers and encompasses substantially one-half of the hopper inlet opening 40 and the width 142 of the second floor section 94 is sized such that the second floor section 94 covers substantially one-half of the hopper inlet opening 40, the first and the second floor sections 92 and 94 being sized to cooperatingly cover and encompass the entire hopper inlet opening 40 when the first and second floor sections 92 and 94 are each pivotally moved to the floor supported cargo hauling positions thereof.

The floor sections 92, 94, 96 and 98 are each connected to the trailer frame 16 such that the hinged connections 128, 144, 162 and 178 each extend along one side of the hopper inlet opening 40, the hinged connections 128, 144, 162 and 178 extending about the entire periphery of the hopper inlet opening 40 for positioning the floor sections 92, 94, 96 and 98 to form a material bin space 182 when positioned in the granular material hauling positions. The floor sections 92, 94, 96 and 98 extend upwardly from the hopper material bin space 40, and the material bin space 182 formed via the floor sections 92, 94, 96 and 98 communicates with and extends the volume of the hopper material bin space 40.

As shown more clearly in FIGS. 7 and 10, a pair of L-shaped stop flanges 184 are secured to the lower face 124 of the first floor section 92 and another pair of the L-shaped stop flanges 184 are secured to the lower face 140 of the second floor section 94. Each of the stop flanges 184 includes a stop surface 186. More particularly, one of the stop flanges 184 is secured to the lower face 124 of the first floor section 92 generally adjacent the end 116 thereof, the stop flange 184 being positioned such that the stop surface 186 thereof extends generally perpendicularly from the end 116 of the first floor section 92 and is generally coplanar therewith. One of the stop flanges 184 is secured to the lower face 124 of the first floor section 92 generally adjacent the end 118 thereof, the stop flange 184 being positioned such that the stop surface 186 thereof extends generally perpendicularly from the end 118 of the first floor section 92 and is generally coplanar therewith. One of the stop flanges 184 is secured to the lower face 140 of the second floor section 94 generally adjacent the end 132 thereof, the stop flange 184 being positioned such that the stop surface 186 thereof extends generally perpendicularly from the end 132 of the second floor section 94 and is generally coplanar therewith. One of the stop flanges 184 is secured to the lower face 140 of the second floor section 94 generally adjacent the end 134 thereof, the stop flange 184 being positioned such that the stop surface 186 thereof extends generally perpendicularly from the end 134 of the second floor section 94 and is generally coplanar therewith.

The stop surfaces 186 of each of the stop flanges 184 thus extends generally along a substantial portion of one of the ends 116 and 118 of the first floor section 92 and one of the ends 132 and 134 of the second floor section 94. In a granular material hauling position of the floor assembly 90, the stop surfaces 186 of the stop flanges secured adjacent the ends 116 and 132 of the first and the second floor sections 92 and 94, respectively, are each disposed in a substantially coplanar relationship and form a stop surface engageable with a portion of the upper face 157 of the forward floor section 96 limiting the pivotal movement of the forward floor section 96 in a pivot direction 164 and positioning the forward floor section 96 in a predetermined granular material hauling position adjacent the ends 116 and 132 of the first and the second floor sections 92 and 94, respectively. The stop surfaces 186 of the stop flanges 184 secured generally adjacent the ends 118 and 134 of the first and the second floor sections 92 and 94, respectively, are each positioned and disposed such that in a granular material holding position of the first and seconf floor sections 92 and 94, the stop surfaces 186 are each disposed in a substantially coplanar relationship and each cooperate to provide a stop surface engageable with a portion of the upper face 174 of the rearward floor section 98 limiting the movement of the rearward floor section 98 in a pivot direction 180 and positioning the rearward floor section 98 in a granular hauling position generally adjacent the ends 118 and 134 of the first and the second floor sections 96 and 98, respectively.

It should be noted that the stop flanges 184 secured to the first and the second floor sections 92 and 94 are each positioned a distance from the respective ends 116, 118, 132 and 134 of the first and the second floor sections 92 and 94 such that, when the first and the second floor sections 92 and 94 are each pivoted in a downward direction toward a floor supported cargo hauling position, each of the stop flanges 184 is disposed in a portion of the trailer frame opening 26 or, more particularly, in a portion of the hopper inlet opening 40 and each of the stop flanges 184 extends downwardly from one of the lower faces 124 and 140 of the first and the second floor sections 92 and 94, thereby positioning the stop flanges 184 beneath the trailer floor and disposed generally within the hopper material bin space 30 in a floor supported cargo hauling position of the floor assembly 90. In this manner the stop flanges 184 are each positioned beneath the floor assembly 90 such that the stop flanges 184 will not interfere nor be exposed to the cargo being loaded onto the floor supporting structure 91 of the trailer floor assembly 90 in this position of the trailer 10.

As shown more clearly in FIG. 10, a latch assembly 188 is connected between the first floor section 92 and the first side wall 46 and is constructed to secure the first floor section 92 in a granular material hauling position. Another latch assembly 188 is connected between the second floor section 94 and the second side wall 48 and is constructed to secure the second floor section 94 in a granular material hauling position. Each of the latch assemblies 188 includes a bolt 190 securing one end of the chain 192 to one of the slat members 72, the opposite end of each of the chains 192 being removably secured to a portion of the lower face 124 or 140 of the first or the second floor sections 92 or 94. When the first and the second floor sections 92 and 94 have each been pivoted in respective pivot directions 130 and 146 to position the first and the second floor sections 92 and 94 in granular material hauling positions, one of the chains 192 is secured to the first floor section 92 via the bolt 194 and the other chain 192 is secured to the second floor section 94 via the bolt 194, thereby securing the first floor section 92 to the first side wall 46 and securing the second floor section 94 to the second side wall 48 positioning the first and the second floor sections 92 and 94 in granular material hauling positions.

As shown more clearly in FIGS. 7 and 10, the latch assembly 188 also includes portions securing the forward and the rearward floor sections 96 and 98 in granular material hauling positions. More particularly, the latch assembly 188 includes four L-shaped latch flanges 200, each of the latch flanges 200 having a latch surface 202 formed on a portion thereof. Two of the latch flanges 200 are secured to the first side wall 46, one of the latch flanges on the first side wall 46 positioned such that the latch surface 202 thereof engages a portion of the lower face 174 of the rearward floor section 98 generally near the end 168 thereof and the other latch flange 200 secured to the first side wall 46 being positioned and diposed such that the latch surface 202 thereof engages a portion of the lower face 158 of the forward floor section 96 generally near the end 150 thereof. Two of the latch flanges 200 are secured to the second side wall 48, one of the latch flanges 200 secured to the second side wall 48 positioned such that the latch surface 202 thereof engages a portion of the lower face 174 of the rearward floor section 98 generally near the end 168 thereof and the other latch flange 200 secured to the second side wall 48 positioned such that the latch surface 202 engages a portion of the lower face 158 of the forward floor section 96 generally near the end 152 thereof.

Thus, the latch flanges 200 are positioned and secured on the first and the second side walls 46 and 48 such that, when the forward and rearward floor sections 96 and 98 have each been pivoted in the respective pivot directions 164 and 182 to granular material hauling positions, the latch flanges 200 are secured to the first and the second side walls 46 and 48 and positioned such that two of the latch surfaces 200 engage the forward floor section 96 securing the forward floor section 96 in a granular hauling position and such that two of the latch surfaces 202 engage the rearward floor section 98 securing the rearward floor section 98 in a granular hauling position. As shown in FIG. 10, each of the L-shaped latch flanges 200 are removably secured to the first and the second side walls 46 or 48 via bolts 204.

The trailer 10a is constructed similar to the trailer 10, as mentioned before, the trailer 10a being connectable to a truck tractor (not shown in FIG. 2) and having a floor assembly 90 positionable in granular material hauling and floor supported cargo hauling positions, in a manner exactly like that described before with respect to the trailer 10. One of the differences between the trailer 10a shown in FIG. 2 and the trailer 10, shown in FIG. 1, is that the trailer 10a includes three hoppers 30a connected to the trailer frame 16 and supported beneath the floor assembly 90 (not shown in FIG. 2) in a manner exactly like that described before with respect to the single hopper 30 secured beneath the trailer frame 16 of the trailer 10. The only difference with respect to the construction and operation of the floor assembly 90 of the trailer 10a is that the floor assembly 90 of the trailer 10a cooperates with the open upper ends of the three hoppers 30a to form the hopper inlet opening 40 and the first and the second floor sections extend over the three hoppers 30a, the lengths 125 and 141 of the first and second floor sections 92 and 94 and the length 112 of the hopper inlet opening 40 each substantially corresponding to the length of the three hoppers 30a of FIG. 2. Thus, with respect to the positioning of the trailer 10a in a granular material hauling position and a floor supported cargo hauling position, the trailer 10a is constructed and will operate substantially similar to the trailer 10, the salient difference being that the trailer 10a includes the three hoppers 30a each cooperating to discharge a portion of the granular material or the like being hauled via the trailer 10a which may be more convenient or desirable in some operational applications.

The first and the second side walls and the forward and the rearward end walls of the trailer 10a each include a plurality of spaced slat members 72 and are each constructed in a manner similar to that described before with respect to the trailer 10 (only the side wall 46a being shown in the drawings). The trailer top 88a of the trailer 10a is solid and includes a flange portion extending about the outer periphery of the trailer top 88a and extending generally downwardly therefrom, one side portion of the top flange 210 being shown in FIG. 2, connected to and forming an upper portion of the first side wall 46a. The top flange 210 extends about the entire periphery of the trailer top 88a and portions of the top flange 210 are connected to and from extended upper portions of the first and the second side walls and the forward and the rearward end walls (only the side wall 46a being shown in FIG. 2) in a manner similar to that shown in FIG. 2 with respect to the first side wall 46a.

In one preferred form, the trailer top flange portion 210 extends downwardly a distance to a position wherein the sides 122 and 134 of the first and the second floor sections 92 and 94, respectively, are each positioned generally adjacent a portion of the trailer top flange portion 210. In this embodiment of the invention, the first and the second floor sections 92 and 94 are thus secured portions of the trailer top flange 210 to secure the first and the second floor sections 92 and 94 in a granular material hauling position. In this manner, the trailer top 88a and the trailer top flange 210 encompass the upper portion of the floor material bin space formed via the first and the second floor sections 92 and 94 and the forward and the rearward end sections 96 and 98 of the floor assembly 90 thereby reducing the circulation of air over the open upper end of the hopper formed via the floor sections 92, 94, 96 and 98 which may be desirable in some operational embodiments.

The trailer top 10b is constructed similar to the trailers 10 and 10a, shown in FIGS. 1 and 2 and described in detail before, the salient difference being that the first and the second side walls and the forward and the rearward end walls (only the first side wall 46b being shown in FIG. 3 for the purpose of clarity) are each formed of a solid panel having a plurality of spaced, vertically extending ventilation openings 77b formed therethrough and spaced thereabout providing the ventilation required when the trailer 10b is positioned in the floor supported cargo hauling position for hauling such floor supported cargo. In a preferred form, the punched ventilation openings 77*b* extend from the trailer frames 16 a distance 214 in a generally upwardly direction toward the trailer top 88*b*, the distance 214 substantially corresponding to the widths 126 and 142 of the first and the second floor sections 92 and 94. In this manner, when the floor sections 92, 94, 96 and 98 are positioned in the granular material hauling position, the first and the second floor sections 92 and 94 encompass a portion of the ventilation openings 77*b* along the first and the second side walls (only the first side wall 46*b* being shown in FIG. 3) thereby reducing the amount of ventilation circulated within the walls of the trailer 10*b* when the trailer 10*b* is utilized to haul granular materials.

OPERATION

In the floor supported cargo hauling position of the trailer 10, the first and the second floor sections 92 and 94 and the forward and the rearward floor sections 96 and 98 are each pivoted in pivot directions generally opposite the pivot directions 130, 146, 164 and 180, as shown in FIG. 11, to a position wherein each of the floor sections 92, 94, 96 and 98 are disposed generally adjacent the trailer frame 16 and supported via a portion of the support beams 28. In this position of the floor assembly 90, the upper faces 124, 140, 158 and 174 of the floor sections 92, 94, 96 and 98 are each disposed in a substantially coplanar relationship with the upper faces of the forward and the rearward floor panels 100 and 102 forming a substantially continuous trailer floor supporting structure 91 for supporting cargo such as cattle or the like loaded into the trailer 10 via the rear door 80 and the side door 84. The spaces or ventilation openings 77 between the slat members 72 of the walls 46, 48, 50 and 52 provide and facilitate the ventilation and circulation of air throughout the trailer in this operational aspect of the invention.

When it is desired to utilize the trailer 10 to haul a granular material, such as grain or sugar or the like, for example, the floor assembly 90 is then positioned in a granular material hauling position opening and exposing the hopper material bin space 38 and positioning the floor assembly 90 to form an additional material bin space 182. To position the floor assembly 90 in the granular material hauling position, the first and the second floor sections 92 and 94 are each initially pivoted in pivot directions 130 and 146, respectively, to a position wherein the first floor section 92 is disposed generally adjacent the first side wall 46 and the second floor section 94 is disposed generally adjacent the second side wall 48.

In this position of the first and the second floor sections 92 and 94, the first floor section 92 is secured to the first side wall 46 via one of the chains 192 and a second floor section 94 is secured to the second side wall 48 via one of the chains 192, thereby securing the first and the second floor sections 92 and 94 in a granular material hauling position.

After the first and the second floor sections 92 and 94 have been positioned in the granular material hauling position and secured in that position via the latch assembly 188, the forward and the rearward floor sections 96 and 98 are pivoted in the respective pivot directions 164 and 180 to a position wherein the forward and the rearward floor sections 96 and 98 engage the stop surfaces 186 of the stop flanges 184 secured to the first and the second floor sections 92 and 94 limiting the movement of the forward and the rearward floor sections 96 and 98 and positioning the forward and rearward floor sections 96 and 98 in granular material hauling positions.

In this position of the forward and the rearward floor sections 96 and 98, the L-shaped flanges 200 are secured to the first and the second side walls 46 and 48, respectively, and positioned such that the latch surfaces 202 engage a portion of the lower faces 158 and 174 of the forward and the rearward floor sections 96 and 98 thereby securing the forward and the rearward floor sections 96 and 98 between the latch flanges 200 and the ends of the first and the second floor sections 92 and 94. The floor sections 92, 94, 96 and 98 are thus positionable in the granular material hauling position in such a manner that the ventilation openings 77 do not interfere with the forming of the material bin space 182, thereby providing a quick, convenient and efficient apparatus for positioning the trailer 10 in granular material and floor supported cargo hauling positions.

Changes may be made in the construction and the operation of the various components and assemblies of the present invention without departing from the spirit and the scope of the invention as defined in the following claims.

What is claimed is:

1. A trailer apparatus, comprising:
   a trailer frame, having a first side, a second side, a forward end, a rearward end and a trailer frame opening formed through a portion thereof;
   a first side wall connected to the first side of the trailer frame and extending a distance upwardly therefrom having ventilation openings formed therethrough;
   a second side wall connected to the second side of the trailer frame and extending a distance upwardly therefrom having ventilation openings formed therethrough;
   a forward end wall connected to the forward end of the trailer frame;
   a rearward end wall connected to the rearward end of the trailer frame, the first side wall, the second side wall, the rearward end wall and the forward end wall each cooperating to form a continuous wall extending about the trailer frame;
   a hopper, having an open upper end defining a hopper inlet opening and an open lower end, the space between the upper end of the lower end defining a hopper material bin space for retainingly storing granular material and the like, the upper end connected to the trailer frame in communication with a portion of the trailer frame opening;
   a hopper door connected to the hopper and positionable in a closed position substantially closing the open lower end of the hopper cooperatingly retaining the granular material and the like within the hopper material bin space and an open position discharging the granular material and the like from the hopper material bin space via the open lower end of the hopper; and
   a trailer floor assembly positionable in a floor supported cargo hauling position and a granular material hauling position, comprising:
      a first floor section, having opposite ends, opposite sides, and an upper and a lower face, one side pivotally connected to the trailer frame generally near the first side of the trailer frame and extending a distance generally between the forward and the rearward ends of the trailer frame, the first side pivotally movable in one direction generally toward the first side of the trailer frame to a granular material hauling position and pivotally movable in one other direction generally toward the trailer frame to a floor supported cargo hauling position, a portion of the lower face of the first floor section supportingly engaging a portion of the trailer frame and covering a portion of the trailer frame opening in the floor supported cargo hauling position thereof, the first floor section being disposed generally adjacent the first side wall and covering the ventilation openings in the first side wall generally adjacent the first floor section in the granular hauling position of the first floor section;

a second floor section, having opposite ends, opposite sides, and an upper and a lower face, one side pivotally connected to the trailer frame generally near the second side of the trailer frame and extending a distance generally between the forward and the rearward ends of the trailer frame, the second side pivotally movable in one direction toward the second side of the trailer frame to a granular hauling position and pivotally movable in one other direction generally toward the trailer frame to a floor supported cargo hauling position, a portion of the lower face of the second floor section supportingly engaging a portion of the trailer frame and covering a portion of the trailer frame opening in the floor supported cargo hauling position thereof, the second floor section being disposed generally adjacent the second side wall and covering the ventilation openings in the second sidewall generally adjacent the second floor section in the granular hauling position of the second floor section;

a forward floor section, having opposite ends, opposite sides, and an upper and a lower face, one side pivotally connected to the trailer frame and extending generally between the first and the second sides of the trailer frame, the forward floor section pivotable in one direction generally toward the rearward end of the trailer frame to a granular material hauling position and pivotable in one other direction generally toward the trailer frame to a floor supported cargo hauling position, a portion of the lower face of the forward floor section engaging a portion of the trailer frame and covering a portion of the trailer frame opening in the floor supported cargo hauling position thereof; and a rearward floor section, having opposite ends, opposite sides, and an upper and a lower face, one side pivotally connected to the trailer frame and extending generally between the first and the second sides of the trailer frame, the rearward floor section pivotable in one direction generally toward the forward end of the trailer frame to a granular material hauling position and pivotable in one other direction generally toward the trailer frame to a floor supported cargo hauling position, a portion of the lower face of the rearward floor section engaging a portion of the trailer frame and covering a portion of the trailer frame opening in the floor supported cargo hauling position thereof, the first and the second floor sections and the forward and the rearward floor sections each cooperatingly forming a material bin space retaining granular material and the like in the granular material hauling positions thereof and each cooperatingly forming a portion of a trailer floor surface supporting floor supported cargo and the like in the floor supported cargo hauling positions thereof, a portion of the material bin space formed via the first and the second floor sections and the forward and the rearward floor sections communicating with the hopper material bin space.

2. The apparatus of claim 1 wherein the side of the first floor section, opposite the side pivotally connected to the trailer frame, is defined further as being disposed generally near the side of the second floor section, opposite the side pivotally connected to the trailer frame in the floor supported cargo carrying position of the first and the second floor sections, and wherein the upper faces of the first and the second floor sections and the upper faces of the forward and the rearward floor sections are each defined further as being disposed in a substantially coplanar relationship in the floor supported cargo carrying position of the first and the second floor sections and the forward and the rearward floor sections.

3. The apparatus of claim 2 wherein the forward floor section is defined further as being pivotally connected to the trailer frame generally near one of the ends of the first floor section and one of the ends of the second floor section; and wherein the rearward floor section is defined further as being pivotally connected to the trailer frame generally near one end of the first floor section, opposite the end near the pivotal connection of the forward floor section, and near the end of the second floor section, opposite the end near the pivotal connection of the forward floor section.

4. The apparatus of claim 3 wherein the open upper end of the hopper cooperates with a portion of the trailer frame opening forming a hopper inlet opening, and wherein the length of the first and the second floor sections, generally between the opposite ends thereof, each substantially corresponds to the length of the hopper inlet opening and wherein the length of the forward and the rearward floor sections generally between the opposite ends thereof, each substantially corresponds to the width of the hopper inlet opening, the first and the second floor sections substantially covering the hopper inlet opening in floor supported cargo hauling positions thereof.

5. The apparatus of claim 2 wherein the upper face of the forward floor section engages portions of one of the ends of the first and the second floor sections limiting the pivotal movement of the forward floor section in one direction and positioning the forward floor section in a granular material hauling position, and wherein the upper face of the rearward floor section engages portions of the ends of the first and the second floor sections, opposite the ends of the first and the second floor sections engaged via the forward floor section, limiting the pivotal movement of the rearward floor section in one direction and positioning the rearward floor section in a granular material hauling position.

6. The apparatus of claim 5 defined further to include:

a plurality of latch flanges, each latch flange secured to one of the first and the second floor sections and each latch flange disposed generally near one of the opposite ends of one of the first and the second floor sections, each latch flange having a portion extending a distance from one of the first and the second floor sections forming a stop surface, one of the latch flanges secured to the first floor section and one of the latch flanges secured to the second floor section each engage a portion of the upper face of the forward floor section limiting the pivotal movement of the forward floor section in one direction positioning the forward floor section in a granular material hauling position in a granular material hauling position of the first and the second floor sections, and one of the latch flanges secured to the first floor section and one of the latch flanges secured to the second floor section each engage a portion of the upper face of the rearward floor section limiting the pivotal movement of the rearward floor section in one direction positioning the forward floor section in a granular material hauling position in a granular material hauling position of the first and the second floor sections;

means removably securing the first and the second floor section in a granular material hauling position; and means removably securing the forward and the rearward floor sections in a granular material hauling position.

7. The apparatus of claim 1 wherein the first and the second floor sections and the forward and the rearward floor sections are each defined further to substantially emcompass the open upper end of the hopper in the granular material hauling positions thereof.

8. The apparatus of claim 1 defined further to include:

a trailer top connected to the upper ends of the first and the second side walls and the upper ends of the forward and the rearward end walls, having top flange portions extending a distance downwardly generally toward the trailer frame and forming a portion of the first and the second side walls and the forward and the rearward end walls, the ventilation openings being formed in the first and the second side walls generally between the top flange portions and the trailer frame and the first and the second floor sections each extending upwardly from the trailer frame terminating with the sides thereof, opposite the side pivotally connected to the trailer frame, disposed generally above the top flange portions.

9. The apparatus of claim 1 defined further to include:

floor panel means secured to the trailer frame cooperating with the first and the second floor sections and the forward and the rearward floor sections to substantially cover the trailer frame opening in a floor supported cargo carrying position of the floor sections.

* * * * *